United States Patent
Severini et al.

[15] 3,676,528
[45] July 11, 1972

[54] PREPARATION OF POLYMERIC COMPOSITIONS OF HIGH IMPACT RESISTANCE

[72] Inventors: Febo Severini; Alberto Valvassori; Carlo Tavazzani, all of Milan, Italy

[73] Assignee: Montecatini Edison S.p.A., Milan, Italy

[22] Filed: Dec. 7, 1970

[21] Appl. No.: 97,475

[30] Foreign Application Priority Data

Dec. 10, 1969    Italy .................................25582 A/69

[52] U.S. Cl. .........................................................260/878 R
[51] Int. Cl. ..................C08f 25/00, C08f 45/68, C08f 45/70
[58] Field of Search.......................................260/878 R, 875

[56] References Cited

UNITED STATES PATENTS 3,285,996   11/1966   Gunderman et al.................260/878 R
3,503,917   3/1970    Burke, Jr..............................260/878 R

FOREIGN PATENTS OR APPLICATIONS 1,054,062   1/1967    Great Britain .....................260/878 R

*Primary Examiner*—Joseph L. Schofer
*Assistant Examiner*—A. Holler
*Attorney*—Hubbell, Cohen & Stiefel

[57] ABSTRACT

Graft polymers having high impact resistance are produced by polymerizing vinyl monomers in an aqueous emulsion of an olefinic rubber having a low degree of unsaturation, wherein the emulsion also contains an aromatic, aliphatic or cycloaliphatic hydrocarbon liquid stabilizer.

8 Claims, No Drawings

PREPARATION OF POLYMERIC COMPOSITIONS OF HIGH IMPACT RESISTANCE

BACKGROUND OF THE INVENTION

1. Field of the Invention

This invention pertains to the field of graft polymerization. More particularly, the invention pertains to the production of impact resistant materials comprising polymers of vinyl monomers grafted onto elastomeric terpolymers.

2. Description of the Prior Art

The polymerization of vinyl monomers in the presence of elastomeric materials to produce products having a high impact resistance is known. For example, high impact polystyrenes and polyvinyl chlorides are prepared in this manner.

The graft polymerization may be conducted according to any of the well known methods generally used for free radical polymerizations. Such polymerizations may be carried out in solution, in bulk, in emulsion, in suspension, or in combinations of the foregoing, such as, for example, in bulk-suspension, solution-precipitation, etc.

Typical elastomers used are butadiene elastomers, copolymers of butadiene with acrylonitrile or styrene and the like, as well as slightly unsaturated elastomers comprising terpolymers of ethylene and alpha olefins, e.g., propylene, with small quantities of a cyclic or an acyclic diene. Such terpolymers have been described in U.S. Pat. applns. Ser. No. 189.322 filed Apr. 23, 1962, now abandoned; Ser. No. 399.860 filed Sept. 28, 1964, now abandoned; and Ser. No. 417.823 filed Dec. 11, 1964, now U.S. Pat. No. 3,444,146.

When the polymerization reaction is conducted in emulsion, it is conventional to add the vinyl monomer or mixture of monomers along with suitably selected catalysts to the aqueous emulsion of the elastomer and then to heat the entire mixture until the polymerization reaction is completed.

In order to ensure good stability of the emulsion and to obtain products having reproducible mechanical properties, it is essential that, throughout this procedure, no coagula separate from the reaction mass. Separation of such coagula is not uncommon when a water soluble vinyl monomer, such as styrene or acrylonitrile is used. Techniques for preventing such separation when using emulsions of butadiene polymers prepared directly by polymerization of the monomers in emulsion are known.

The impact resistant materials wherein the elastomer is one having a low degree of unsaturation as described hereinabove, are made by first preparing an aqueous emulsion of the starting elastomer, for example, as described in Italian Pat. No. 770,361. Emulsions with these types of elastomers, however, sometimes vary in their stability characteristics. This in turn may give rise to the formation of considerable quantities of coagula during the course of the graft polymerization reaction. Moreover, it is sometimes difficult to control the product uniformity, particularly with respect to the mechanical properties of the product, from polymerization to polymerization. The instability of the emulsions and non-uniformity of the mechanical properties of the products generally result from the poor reproducibility of the emulsification process or the presence of impurities in the starting elastomer, such as, catalytic residues, small quantities of dienic monomer, antioxidants, and additives which were admixed with the elastomer to improve its processability.

SUMMARY OF THE INVENTION

We have discovered that the formation of coagula during the course of a graft polymerization wherein a vinyl or vinylidene monomer is polymerized in an aqueous emulsion of an olefinic rubber having a low degree of unsaturation can be minimized by carrying out the polymerization in an emulsion containing a stabilizing liquid comprising an aromatic, aliphatic or cycloaliphatic hydrocarbon or a mixture of such hydrocarbons. The improved stability of the emulsions prevents premature termination of the polymerization and results in improved reproducibility of the mechanical properties of the raw products obtained.

DESCRIPTION OF THE PREFERRED EMBODIMENTS

The process of the present invention is carried out by first forming an aqueous emulsion of an olefinic rubber having a low degree of unsaturation in a manner well known in the art.

A low unsaturation rubber preferred for use in our process is a terpolymer of ethylene, an alpha-olefin, e.g., propylene or butene-1, and a third monomer which is a cyclic or acyclic polyene with conjugated or unconjugated double bonds.

Particularly preferred terpolymers are those containing as the third monomer at least one of the following polyenes: pentadiene-1 hexadiene-1,4; hexadiene-1,5; heptadiene-1,5; dodecatriene-1,7,9; methyl-heptadiene-1,5; 6-alkyliden-(O)norbornene; norbornadiene-2,5; 2-alkyl-norbornadiene-2,5; cyclooctadiene-1,5; dicyclopentadiene, tetrahydroindene and 5-methyl-tetrahydroindene.

Preferably, the terpolymers have an ethylene content of between about 20 and 80 mol percent, a polyene content of from about 0.1 to 20 mol percent, and a molecular weight of from about 50,000 to 800,000 and preferably from about 70,000 to 500,000.

The monomers to be grafted onto the terpolymers are added to the emulsion together with the liquid stabilizer and other additives as hereinafter described.

Suitable liquid stabilizers for use in the present invention are aromatic, cycloaliphatic, or aliphatic hydrocarbons, or mixtures thereof. Representative hydrocarbons are benzene or toluene, fully or partially hydrogenated derivatives of benzene and lower alkyl benzene derivatives, such as cyclohexane, methylcyclohexane or the cyclohexenes, and aliphatic hydrocarbons such as n-butane, the pentanes, n-hexane, n-heptane, the octanes, as well as mixtures of the foregoing hydrocarbons. Preferred hydrocarbons are: benzene, toluene, cyclohexane and n-heptane.

The amount of liquid hydrocarbon stabilizer used is in the range of from about 5 to 50 percent by weight based on the weight of the total aqueous emulsion.

The stabilizer may be added alone, directly to the starting aqueous emulsion, or, preferably, together with the monomer or mixture of monomers and, as desired, in one or more steps, depending on the particular grafting procedure employed.

If it is desired to use a pre-crosslinked terpolymer in the grafting reaction, the crosslinking is first carried out before the grafting reaction by heating the dispersion of the terpolymer in the presence of a crosslinking agent, such as benzoyl-peroxide, dicumyl-peroxide, or di-tertiary butyl peroxide, in the presence or absence of a polyfunctional vinyl monomer such as divinylbenzene, allylacrylate, and the like.

The grafting reaction may be carried out directly in the emulsion obtained by dispersing in water the "pseudo-solution" (i.e. a mass of pasty consistency) obtained by mixing the terpolymer with the hydrocarbon solvent stabilizer, in the presence of a suitable surfactant, as hereinafter described.

The grafting reaction is usually carried out at temperatures between about 35° and 160°C, depending upon the type of initiator used.

Suitable monomers for grafting onto the elastomer include styrene and derivatives thereof substituted in either or both of the phenyl nucleus and the vinyl radical, for example, the chloro-styrenes, methyl-styrenes, ethyl-styrenes, and alpha-methyl-styrenes; acrylic monomers, for example, acrylonitrile, methacrylonitrile, acrylic acid,methacrylic acid, alkyl $C_1 - C_8$ acrylates and methacrylates; and other vinyl or vinylidene monomers such as vinyl chloride, vinyl acetate, vinylidene chloride, and the like.

The foregoing monomers may be used either alone or in admixture with each other.

Suitable initiators for the graft polymerization include organic peroxides known in the art for such purposes, such as acetyl peroxide, lauroyl peroxide, benzoyl peroxide, di-tert butyl peroxide; inorganic peroxide compounds, such as ammonium persulfate; thermo-labile azo-derivatives such as azo-bis-isobutyronitrile and the like; and redox systems consisting of hydroperoxides and a reducing agent, and the like.

The initiator may be added to the reacting mass either in a single step or in repeated steps during the course of the reaction. The quantity of initiator used, based on the total reaction mass, may be from about 0.2 to 10 percent by weight, but is preferably between about 0.5 and 5 percent.

The polymerization may be conducted in the presence of varying quantities of molecular weight regulators used in the art for such purposes, such as dodecyl mercaptan, terpinolene, halohydrocarbons such as sym-dichloroethylene, or substances having an analogous effect.

Suitable surfactants for use in the graft polymerization in aqueous emulsion are anionic surfactants such as sodium dodecylbenzenesulfonate or sodium oleate, non-ionic surfactants such as the reaction products of lower alkylphenols with ethylene oxide, mixtures of non-ionic surfactants and anionic surfactants, and products derived from the sulfatization of the reaction products of the lower alkylphenols with ethylene oxide. Equally good results may be attained by using mixtures of the selected surfactant with small quantities (0.05 to 2 percent by weight on the total reaction mass) of a water-soluble polymer.

Suitable water-soluable polymers are polyvinyl alcohol, lower alkyl cellulose polymers, acrylic acid polymers, acrylamide polymers, and the like.

The total quantity of surfactant and water-soluble polymer used, based on the total reaction mass, may be from about 0.2 to 6 percent by weight, and may be added to the reacting mass either all at once or in successive steps.

The raw product is coagulated from the reaction mixture by the addition of materials well known for this purpose, e.g., methyl alcohol, ethyl alcohol, and the like. The product may then be washed, dried, homogenized and molded into the desired article.

The raw product obtained from the graft polymerization may contain quantities of elastomer varying from about 10 to 70 percent by weight. Compositions containing quantities of elastomer between about 10 and 30 percent by weight are preferred because they possess particularly high values of resilience.

The products obtained according to this process are easily workable on standard machinery and are miscible with other polymeric materials, such as styreneacrylonitrile copolymer or polyvinyl chloride. Such compositions, upon molding, give materials possessing excellent appearance. Generally, of course, the mechanical properties vary with the elastomer content of the product.

The following examples serve to illustrate our invention.

EXAMPLE 1 a. Preparation of an aqueous emulsion of an ethylene-propylene-ethylidenenorbornene terpolymer One hundred g of an ethylene-propylene-ethylidenenorbornene terpolymer having a propylene content of 42.4 percent by weight, a diene content of 3.1 percent by weight and a Mooney viscosity ML (1+4) at 100°C of 60 were admixed with 900 g of toluene and then stirred at room temperature until a homogeneous pasty mass was obtained. To the thus prepared pseudosolution were then added 12 g of a surfactant known under the commercial name of Fenopon Co 436 (containing 50 percent by weight of the ammonium salt of the sulfate of an alkylphenoxy-polyethyleneoxyethanol) and then, slowly, with stirring, 900 g of deionized water.

The mixture thus obtained was then emulsified by stirring for about 20 minutes and the toluene was removed from the thus prepared latex by distillation under reduced pressure. The aqueous emulsion was then concentrated to obtain a dry solids content of 12.5 percent, which corresponds to a terpolymer content of 11.7 percent by weight.

b. Graft polymerization of styrene-acrylonitrile copolymer onto terpolymer in the presence of aromatic hydrocarbons Into a five-necked flask, fitted with a stirrer, cooling means, a pipe for the scrubbing of the nitrogen, and a separatory funnel, were placed 170 g of the latex prepared as in part (a), 9 g of a 5 percent polyvinyl alcohol solution, 7.5 g of Fenopon Co 436 and 219 g of deionized water.

The flask was then immersed in a bath maintained at a temperature of 80°C and, while constantly stirring the reaction mass, the air was removed by bubbling nitrogen through the mixture. Thereupon, in four stages at 2-hour intervals, equal portions of a mixture consisting of 28 g of acrylonitrile, 52 g of styrene and 52 g of benzene containing 1 g of dissolved benzoyl peroxide were added to the mixture.

After 8 hours the polymerization reaction was completed and an apparently homogeneous latex was discharged from the reactor. On filtering the latex on a metal net having 3,500 meshes/cm$^2$, 1 g of clots was separated.

The emulsion was coagulated by pouring it into an excess of methyl alcohol and the thus obtained coagulum was filtered and washed. After drying the separated material, 99 g of raw polymerization product having a rubber content of 20 percent by weight were recovered. Extraction of a small quantity of the product with boiling cyclohexane indicated that 50 percent by weight of the elastomer was incorporated in the graft. The quantities of non-grafted styrene and non-grafted acrylonitrile were determined by extracting the non-grafted acrylonitrile-styrene copolymer from the raw reaction product with acetone at boiling temperature.

Thus, determined the quantity of monomers chemically bound to the substrate was 28 percent by weight of the charged monomers. Based on this data, the raw product contained 32.4 percent by weight of the grafted product.

The raw reaction product was then homogenized in a roll-mill mixer at 185°C, and the obtained products were subsequently compression molded at a temperature of 180°C.

The mechanical characteristics of samples of plates from the compression molding were determined according to the ASTM standards listed below:

| | |
|---|---|
| Izod resilience on notched test pieces: | ASTM D 256–56 |
| Rockwell hardness test: | ASTM D 785–62 |
| Yield point under tensile stress: | ASTM D 638–61 T |
| Breaking load under tensile stress: | ASTM D 638–61 T |
| Elongation at breaking point: | ASTM D 638–58 T |

The mechanical properties of the raw polymerization product thus obtained were:

| | |
|---|---|
| Izod resilience at 23°C (with notch) (the test pieces do not break) | = 39 kg.cm./cm. |
| Rockwell hardness (scale 'R') | = 89 |
| Breaking load under tensile stress | = 400±30kg/sq.cm. | c. The graft polymerization described in part (b) was repeated, with the exception that benzene was not present. On filtering the obtained latex through a metal net having 3,500 mesh/cm$^2$, about 15 g of clots were separated.

EXAMPLE 2 d. Preparation of crosslinked elastomer

To 400 g of an aqueous emulsion, prepared as in part (a) of Example 1, were added 1.4 g of benzoyl peroxide. The mass was then heated at 77°C for 5 hours in a nitrogen atmosphere under constant stirring. A sample of this emulsion was coagulated in ethanol and the coagulate washed and dried. Extraction of the terpolymer in boiling toluene indicated that 40 percent of the elastomer was crosslinked.

e. Grafting polymerization in the presence of benzene

The cross-linked elastomer obtained from part (d) was graft polymerized using the procedure outlined in Example 1, part (b).

By filtration of the latex on a metal net having 3,500 mesh/cm², 1 g of clots was separated. The emulsion was coagulated by pouring it into ethyl alcohol. After filtration and subsequent washing and drying of the separated material, 99 g of raw polymerization product were recovered. This product contained 20 percent rubber, 85 percent of which was crosslinked and grafted. Twenty-two percent by weight of the initial acrylonitrile and styrene were incorporated in the grafted product. The raw product contained 34.6 percent by weight of grafted product, which, after homogenization and molding into plates possessed the following mechanical properties:

| | |
|---|---|
| Izod resilience (with notch) at 23°C (the test pieces do not break) | = 65.5 kg.cm./cm. |
| Rockwell hardness (scale 'R') | = 84 |
| Breaking load under tensile stress | = 330 kg/sq.cm. |
| Elongation at break | = 100% | f. The graft polymerization described in part (e) was repeated except that benzene was not present. On filtration of the latex on a metal net having 3,500 mesh/cm², 10 g of clots separated.

The emulsion was coagulated in ethyl alcohol, and the coagulate was filtered, washed and dried. Ninety g of raw product which contain 20% rubber were recovered. 81.5 percent of this rubber was crosslinked and grafted. 20.5 percent by weight of the initial acrylonitrile and styrene was incorporated in the graft.

The raw product contained 32.7 percent of grafted product, which, after homogenization and molding into plates, possessed the following mechanical properties:

| | |
|---|---|
| Izod resilience (with notch) at 23°C | = 9.5 kg.cm./cm. |
| Rockwell hardness (scale 'R') | = 87 |

EXAMPLE 3

Fifty g of ethylene-propylene-ethylidenenorbornene terpolymer having the following composition by weight:

propylene = 48%      diene = 3.9%      ethylene = 48.1% and a Mooney viscosity ML (1+4) at 100°C = 105, were contacted with 450 g of benzene, and the mass was then subjected to constant stirring until a homogeneous paste was obtained.

To the thus obtained pseudosolution were then added 6 g of Fenopon Co 436 and 450 g of deionized water. The mixture was emulsified by stirring for about 20 minutes until it was transformed into an apparently homogeneous, fluid and stable emulsion. 22.5 g of a 5 percent polyvinyl alcohol solution, 19 g of Fenopon Co 436 and 450 g of deionized water were added to this emulsion with stirring.

To the thus obtained mixture, in a stainless steel, 2 liter autoclave, fitted with an anchor stirrer and heated by hot oil circulation, were added 200 g of a mixture consisting of 70 g of acrylonitrile and 130 g of styrene in which 2.5 g of benzoyl peroxide were dissolved. After elimination of the air by flushing with nitrogen, the mass was heated to 85°C while keeping it under stirring. After 8 hours, the polymerization was practically complete and a fluid, apparently homogeneous mass completely free of clots was discharged from the reactor.

The emulsion was then coagulated in ethyl alcohol and the coagulate filtered, washed and dried. Two hundred and fifty g of raw product containing 20 percent rubber, 76 percent of which was not extractable with cyclohexane, were recovered.

20 percent by weight of the initial acrylonitrile and styrene was incorporated in the graft.

The raw product, containing 31.7 percent of grafted product, was then diluted with an acrylonitrile-styrene copolymer containing 25% acrylonitrile and having an intrinsic viscosity of 0.8 dl/g as determined on a 1 gram sample in 100 cc of dimethyl-formamide at 30° C, to provide a blend wherein the rubber content was 17.5%. After homogenization, the blend was molded into plates which had the following mechanical properties:

| | |
|---|---|
| Izod resilience (with notch) at 23°C (the test pieces do not break) | = 62 kg.cm./cm. |
| Rockwell hardness (scale'R') | = 100 |
| Yield point under tensile stress | = 425 kg/sq.cm. |
| Breaking load under tensile stress | = 375 kg/sq.cm. |

EXAMPLE 4

The procedure of Example 3 was followed except that the ethylene-propylene-ethylidenenorbornene terpolymer used had the following composition:

propylene = 42.4%      diene = 3.1%      ethylene = 54.5% and a Mooney viscosity ML (1+4) at 100°C of 60.

The emulsion was coagulated in ethyl alcohol, and the coagulate was filtered, washed and dried. Two hundred and fifty g of raw product containing 20 percent of rubber, 55 percent of which rubber was not extractable with cyclohexane, were recovered.

Thirteen percent by weight of the acrylonitrile and styrene were incorporated in the graft. The raw product, which contained 21.4% of grafted material, was diluted with an acrylonitrile/styrene copolymer containing 25 percent of acrylonitrile, having an intrinsic viscosity of 0.8 dl/g, as determined on a one gram sample in 100 cc of dimethylformamide at 30°C. The blend was homogenized and molded to produce plates having the following mechanical properties:

| | |
|---|---|
| Izod resilience (with notch) at 23°C (the test pieces do not break) | = 37 kg.cm./cm. |
| Rockwell hardness (scale 'R') | = 95 |
| Yield point under tensile stress | = 420±20 kg/sq.cm. |
| Breaking load under tensile stress | = 390±15 kg/sq.cm. |

EXAMPLE 5

The procedure of Example 3 was followed except that a pseudosolution in toluene of an ethylene-propylene-ethylidene-norbornene terpolymer having the following composition:

propylene = 42.4%      diene = 3.1%      ethylene = 52.5% and a Mooney viscosity ML (1+4) at 100°C of 60 was used.

The fluid mass discharged from the reactor was free of clots. The toluene present was removed by distillation under reduced pressure.

The thus obtained aqueous emulsion was then coagulated in ethyl alcohol. After centrifuging, washing and drying the coagulate, 250 g of raw product were obtained which contained 20 percent rubber, 70 percent of which rubber was not extractable with cyclohexane.

This material was blended with the acrylonitrile-styrene copolymer described in Example 3, to give a rubber content of 17.5 percent. The plates obtained after homogenization and molding of the resulting blend had the following mechanical properties:

| | |
|---|---|
| Izod resilience (with notch) at 23°C (the test pieces do not break) | = 39 kg.cm./cm. |
| Rockwell hardness (scale 'R') | = 100 |

EXAMPLE 6

Example 5 was repeated except that n-heptane was used as the solvent. At the end of the reaction, the fluid mass discharged from the reactor was free of clots.

After coagulation with ethyl alcohol and centrifuging, washing and drying of the coagulate, 250 g of raw product which contained 20 percent rubber, 70 percent of which was not extractable with cyclohexane were obtained.

This material was blended with the acrylonitrile-styrene copolymer described in Example 3 to give a rubber content of 17.5 percent by weight. The plates obtained after homogenization and molding of the resulting blend had the following mechanical properties:

| | |
|---|---|
| Izod resilience (with notch) at 23°C | = 39 kg.cm./cm. |

(the test pieces do not break)
Rockwell hardness (scale 'R') = 100

Variations can, of course, be made without departing from the spirit and scope of this invention.

Having thus described the invention, what is desired to be secured by Letters Patent and hereby claimed is:

1. In a process for preparing graft copolymers comprising polymerizing a vinyl or vinylidene monomer in an aqueous emulsion of an olefinic rubber having a low degree of unsaturation, an improvement which comprises carrying out the polymerization in an emulsion containing from about 5 to 50 percent by weight, based on the total weight of the emulsion, of a hydrocarbon liquid selected from the group consisting of aromatic, aliphatic and cycloaliphatic hydrocarbons and mixtures thereof.

2. The process of claim 1, wherein the olefinic rubber is a terpolymer of ethylene, propylene, and a cyclic or acyclic polyene.

3. The process of claim 2, wherein the polyene is selected from the group consisting of pentadiene-1,4; hexadiene-1,4; hexadiene-1,5; heptadiene-1,5; dodecatriene-1,7,9; methylheptadiene-1,5; 6-alkyliden-(O)-norbornene; norbornadiene-2,5; a 2-alkyl $C_1 - C_4$-norbornadiene-2,5; cyclooctadiene-1,5; dicyclopentadiene, tetrahydroindene and 5-methyl-tetrahydroindene.

4. The process of claim 2, wherein the terpolymer has an ethylene content between about 20 and 80 mol percent and a molecular weight of from about 50,000 to 800,000.

5. The process of claim 2, wherein the terpolymer is crosslinked by heating the dispersion of the terpolymer in the presence of a crosslinking agent prior to the grafting reaction.

6. The process of claim 1, wherein the hydrocarbon liquid is selected from the group consisting of benzene, lower alkyl substituted benzenes, saturated and unsaturated acyclic hydrocarbons, saturated and unsaturated cyclic hydrocarbons, and mixtures of the foregoing.

7. The process of claim 1, wherein as hydrocarbon liquids are employed benzene and/or toluene, cyclohexane, n-butane, n-pentane, a mixture of pentanes, n-heptane or a mixture of benzene and/or toluene with n-heptane or with cyclohexane.

8. The process of claim 1, wherein the vinyl or vinylidene monomer is selected from the group consisting of styrene, a chlorostyrene, a methyl styrene, an ethyl styrene, alpha methyl styrene, acrylonitrile, methacrylonitrile, acrylic acid, methacrylic acid, an alkyl $C_1 - C_8$ acrylate, an alkyl $C_1 - C_8$ methacrylate, vinyl chloride, vinyl acetate and vinylidene chloride.

* * * * *